US010960949B2

United States Patent
Khanna

(10) Patent No.: US 10,960,949 B2
(45) Date of Patent: Mar. 30, 2021

(54) VIBRATION SENSOR ON MOTORCYCLE FOR PROVIDING REACTIONARY FUNCTION

(71) Applicant: Honda Motor Co., Ltd., Tokyo (JP)

(72) Inventor: Rahul Khanna, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 198 days.

(21) Appl. No.: 16/169,357

(22) Filed: Oct. 24, 2018

(65) Prior Publication Data

US 2020/0130768 A1  Apr. 30, 2020

(51) Int. Cl.
*B62D 6/00* (2006.01)
*B62K 11/14* (2006.01)
*B62K 23/02* (2006.01)
*B62J 45/40* (2020.01)

(52) U.S. Cl.
CPC ............. *B62K 11/14* (2013.01); *B62J 45/40* (2020.02); *B62K 23/02* (2013.01)

(58) Field of Classification Search
CPC ........ B62J 45/414; B62J 45/422; B62J 45/40; B62K 11/14; B62K 23/02
USPC ............................................. 180/333; 701/41
See application file for complete search history.

(56) References Cited

U.S. PATENT DOCUMENTS

| | | |
|---|---|---|
| 6,798,340 B2 | 9/2004 | Ota |
| 7,124,852 B2 | 10/2006 | Hasegawa |
| 2004/0164850 A1 | 8/2004 | Konno et al. |
| 2006/0259205 A1 | 11/2006 | Krum |
| 2013/0265261 A1 | 10/2013 | Min |
| 2015/0291032 A1* | 10/2015 | Kim .................... G06F 3/04842 701/36 |
| 2017/0088013 A1* | 3/2017 | Shimizu ................... B62M 7/04 |
| 2018/0009414 A1 | 1/2018 | Keating et al. |
| 2018/0257703 A1* | 9/2018 | Dreyer ................ B62D 15/021 |
| 2018/0339745 A1* | 11/2018 | Nakamura ............ B62K 11/02 |
| 2019/0193754 A1* | 6/2019 | Augst ............... B60W 50/0097 |

FOREIGN PATENT DOCUMENTS

| | | |
|---|---|---|
| EP | 2412588 | 2/2012 |
| KR | 100729471 | 6/2007 |

* cited by examiner

*Primary Examiner* — Toan C To
(74) *Attorney, Agent, or Firm* — Rankin, Hill & Clark LLP

(57) ABSTRACT

A control system for a vehicle and method for controlling a vehicle component. The control system includes a sensor and a controller. The sensor senses vibrations of the vehicle and senses alterations to the vibrations that result from user contact with a handle of the vehicle. The alterations are associated with a particular vehicle component and/or a particular predetermined function to be performed by the vehicle component. The controller receives an indication of the vibrations and the alterations from the sensor, and then causes the vehicle component to perform the predetermined function that is associated with the alterations.

20 Claims, 3 Drawing Sheets

US 10,960,949 B2

VIBRATION SENSOR ON MOTORCYCLE FOR PROVIDING REACTIONARY FUNCTION

BACKGROUND

User control of a vehicle component typically requires a user to directly contact the component or directly contact a controller for the component to cause the component to perform a function. A driver of a vehicle may have to take on e or both of their hands off of a steering wheel/handle(s) in order to make this direct contact with the component or controller. Removal of a user's hand(s) from the steering wheel/handle(s) may result in the user having diminished control over the vehicle, which can result in a vehicular accident.

BRIEF DESCRIPTION

According to one aspect, a control system of a vehicle includes a sensor detecting vibrations of the vehicle, and a controller in communication with the sensor and in communication with a vehicle component of the vehicle. User contact with a steering handle of the vehicle produces alterations to the vibrations that are detected by the sensor. The controller controls the vehicle component to perform a predetermined function associated with the alterations.

According to another aspect, a method of controlling a vehicle component includes sensing with a sensor, vibrations of a vehicle, and alterations to the vibrations resulting from user contact with a steering handle of the vehicle. The method includes receiving at a controller and from the sensor, a communication of the vibrations and the alterations sensed by the sensor. The controller controls a vehicle component to perform a predetermined function associated with the alterations.

DETAILED DESCRIPTION

Figure 1:
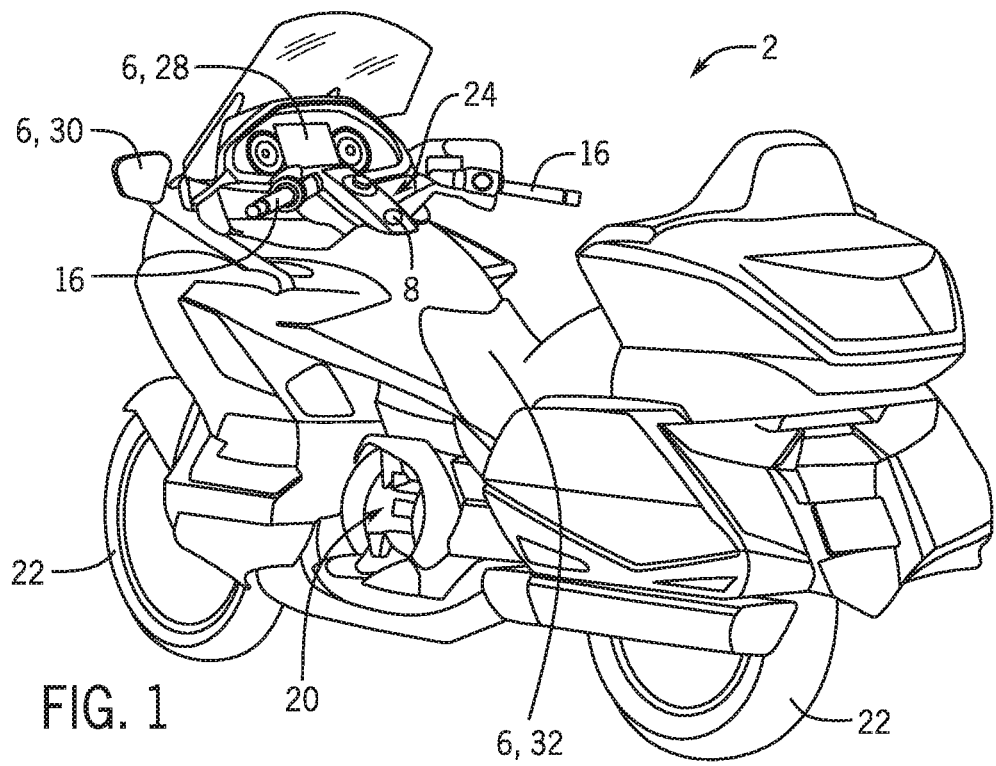
FIG. 1 is a schematic perspective view of a vehicle including a control system according to an exemplary embodiment.

Referring to the FIGS., a vehicle 2 (e.g. a motor cycle) includes a control system 4 for controlling one or more vehicle components 6 of the vehicle 2. The control system 4 includes a sensor 8 and a controller 10. The sensor 8 detects vibrations 12 produced by the vehicle 2, and detects alterations to the vibrations 12 that are a result of user contact 14 with a handle 16 of the vehicle 2. The controller 10 is in communication with the sensor 8 to receive an indication of the detected vibrations 12 and the alterations to the vibrations 12. The controller 10 is also in communication with the vehicle component 6 for controlling the vehicle component 6. The controller 10 controls the vehicle component 6 to perform one or more predetermined functions 18 that are associated with the alterations.

Figure 2:
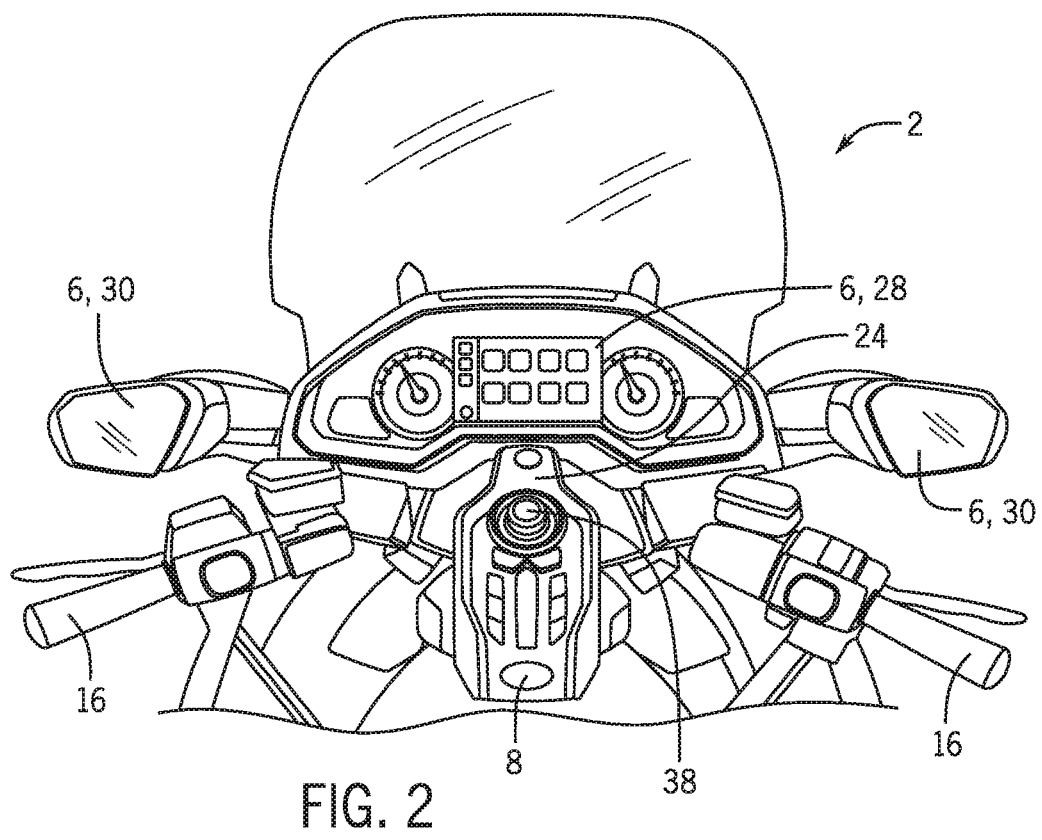
FIG. 2 is a schematic perspective partial view of the vehicle of FIG. 1.

The vehicle 2 can include any type of mode of transportation that includes the handle 16 for a user to engage while riding the vehicle 2. The vehicle 2 can include, but is not limited to, an automobile such as a car or truck; a motorcycle (FIGS. 1-2) of other two-wheeled engine-powered vehicle; a personal transportation device such as a scooter, a self-balancing personal transporter such as a Segway®, or a bicycle that is powered or not by a motor or an engine; a watercraft such as a motor boat, and underwater marine vehicle; an aircraft such as an airplane or helicopter; or any other vehicle that includes the handle 16 that a user can engage while riding the vehicle 2. In an exemplary embodiment, the vehicle 2 includes a motorcycle as depicted in FIGS. 1-2.

Vibrations 12 produced by the vehicle 2 can include those made by an operating power source 20 of the vehicle 2, such as a combustion engine or electric motor, that is used to move the vehicle 2 in a particular direction. The vibrations 12 may also include those produced during movement of the vehicle 2, such as those caused by contact between wheels 22 of the vehicle 2 and the ground, by friction between moving parts of the vehicle 2 (e.g. wheel bearings), or by friction caused by movement of air around the vehicle 2. The vibrations 12 produced by the various vibration sources may be different from one another, and the sensor 8 may be able to sense such differences and the controller 10 may be able to differentiate such vibrations 12 base on these differences.

The handle 16 of the vehicle 2 can include one or more vehicle components that can be contacted (e.g. being gripped or touched) by a user (i.e. user contact 14). The handle 16 can include one that is used to steer or guide the vehicle 2 during travel, such as a steering wheel of a car or steering handle(s) (e.g. handle bars) of a motor cycle (FIGS. 1-2). The handle 16 can also include one that is contacted by the user during travel for a purpose other than steering the vehicle 2, such as a handle used to stabilize the user relative to the vehicle 2 during travel, and the handle 16 is not required to be used to steer or guide the vehicle 2. In an exemplary embodiment, the handle 16 includes two steering handles of a motor cycle as depicted in FIGS. 1-2.

The sensor 8 can include one or more sensing devices that detect/sense the vibrations 12 produced by the vehicle 2 or a component thereof (e.g. the power source 20), or by movement of the vehicle 2, and can sense the alterations to the vibrations 12. In one embodiment, the sensor 8 includes an accelerometer. The sensor 8 can be arranged anywhere on the vehicle 2, including, but not limited to, on a center console 24 or even in the handle 16 of the vehicle 2. In one embodiment the sensor 8 is arranged in the center console 24 of a motorcycle as depicted in FIGS. 1-2. The sensor 8 is in communication with the controller 10 and sends a communication (e.g. signal) 26 to the controller 10 indicating the sensed vibrations 12 and alterations.

The controller 10 can include one or more electronic devices, such as an electronic control unit of the vehicle 2 for example, that receives the communication 26 from the sensor 8 and controls the vehicle component 6 to perform the predetermined function 18 that is associated with the sensed alterations. The controller 10 can include a memory or have access to a memory in which is stored an association a) between the alterations and the vehicle component 6 to be controlled, and/or b) between the alterations and the predetermined function 18 to be performed. Association between the alterations and the vehicle component 6, and/or between the alterations and the predetermined function 18, can be established by the user of the vehicle 2. The user can program the controller 10 to associate the alterations with a specific and predetermined vehicle component 6, or the controller 10 can use machine learning to associate the alterations with a specific and predetermined vehicle component 6 as a function of input feedback from the user. By performing machine learning, the controller 10 could come to determine which fingers or hands are contacting the handle 16 and what type of user contact 14 is being made with the handle 16 based on the vibrations sensed by the sensor 8. The association between the predetermined function and the type of user contact 14 with the handle 16 may then be programmed in the controller 10. Machine learning may be performed by determining increasingly smaller variances in the movement of fingers and hands relative to the handle 16. That is, while the smaller variances may not be programmed into the controller 10, machine learning would allow the controller 10 to determine that certain fingers/hand movements may cause similar predetermined functions 18 to be performed.

The association can also be established by a manufacturer of the vehicle 2 or of the control system 4. The controller 10 can cause the vehicle component 6 to perform the predetermined function 18, which can include enabling the vehicle component 6 to be directly controlled by the user, or disabling the vehicle component 6 from being able to be directly controlled by the user.

The controller 10 can perform an analysis on the alterations and determine a type of user contact 14 that is being made with the handle 16. For example, the controller 10 may perform an analysis on the alterations to determine if the user contact 14 includes one or more of gripping, sliding, or touching without gripping or sliding. The controller 10 can then associate the type of user contact 14 with a particular vehicle component 6 and/or a particular predetermined function 18. The controller 10 can then generate a control signal that is associated with the type of the user contact 14, which is sent to the vehicle component 6 and causes the vehicle component 6 to perform the predetermined function 18.

Figure 3:
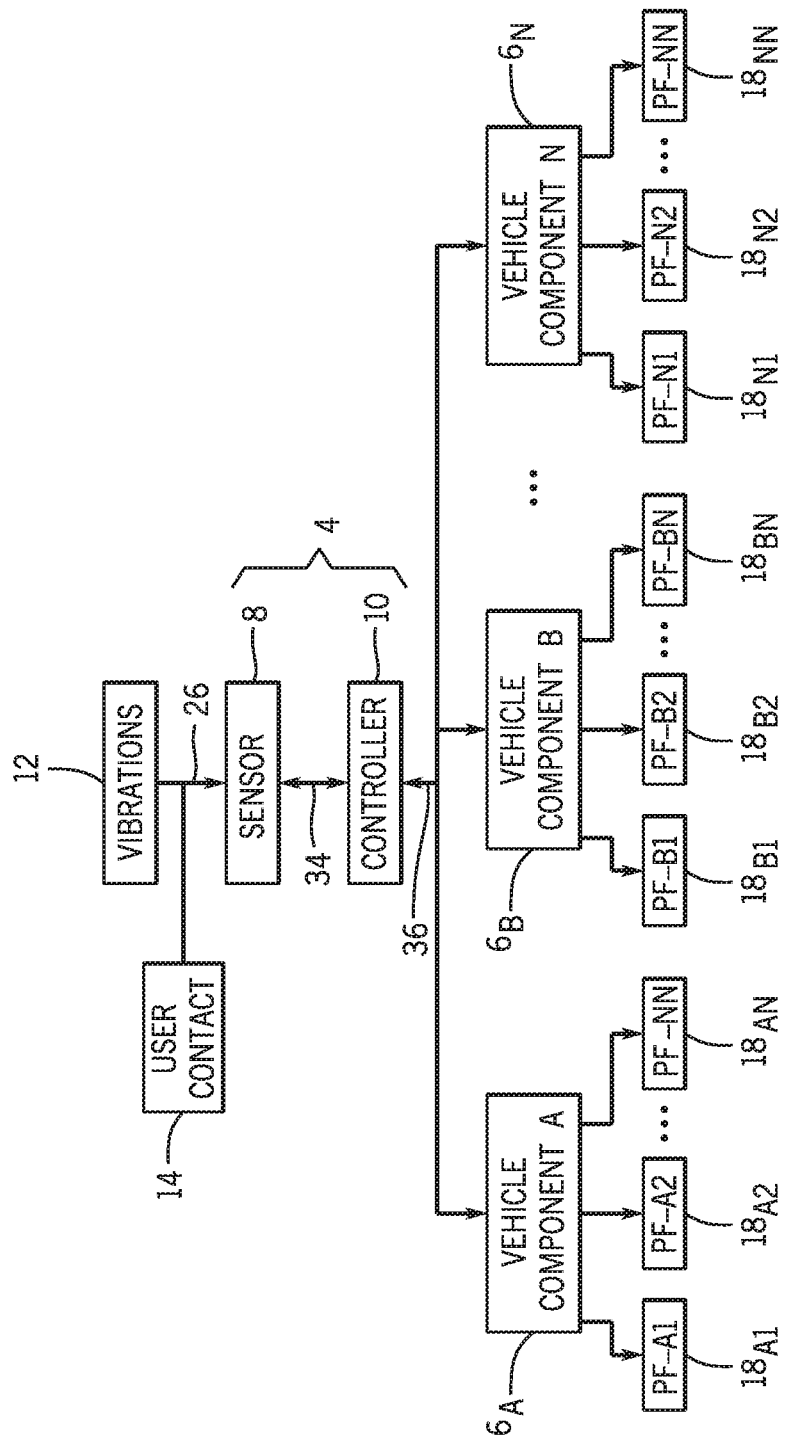
FIG. 3 is a schematic diagram of a control system according to an exemplary embodiment.

The vehicle component 6 is not particularly limited, and can include for example a display screen 28 (e.g. a graphical user interface—GUI), an infotainment system, a heads up display, a display screen, an HVAC system; various moveable components of the vehicle 2 (e.g. a mirror 30, a seat 32), or components or combinations thereof. In one non-limiting example, the vehicle component is a display screen 28 or GUI, which can be used in a process of controlling various other vehicle components 6 or non-vehicle components (such as a mobile device that is in communication with the vehicle 2, for example). As shown in FIG. 3, the vehicle component 6 can include a first vehicle component (indicated "vehicle component A") $6_A$, a second vehicle component (indicated "vehicle component B") $6_B$, and so on up to an $N^{th}$ vehicle component (indicated "vehicle component N") $6_N$.

Communication 34 between the sensor 8 and the controller 10, and communication 36 between the controller 10 and the vehicle component 6 are not particularly limited, and can be established through one or more wired or wireless communication links. The communications 34, 36 can include any types of signals, which can be sent, requested, or received according to various communication schemes, platforms, or architectures. The communication 34 between the sensor 8 and the controller 10 includes an indication of the detected vibrations 12 and the alterations thereto that are produced as a result of the user contact 14 with the handle 16 of the vehicle. The communication 36 between the controller 10 and the vehicle component 6 includes a control signal that causes the vehicle component 6 to perform the predetermined function 18, and thus allows the controller 10 to control the vehicle component 6.

The user contact 14 with the handle 16 can include contact between one or more of the user's hands and the handle 16 either during motion of the vehicle 2 or when the vehicle 2 is not in motion. The user contact 14 can include one or more types of contact between the user's hand and the handle 16. Such types of user contact 14 can include, but are not limited to, a user's hand gripping the handle 16, a user's hand sliding along a surface of the handle 16, a user's hand touching the handle 16 without gripping or sliding. The user contact 14 that causes the predetermined function 18 to be performed can be limited to a one or more types of user contact 14, such that alterations to the vibrations 12 as a result of one type of user contact 14 may not cause the predetermined function 18 to be performed, while another different type of user contact 14 may cause the predetermined function 18 to be performed.

As used herein, "gripping" includes a user's hand, including at least one finger of the hand, contacting and wrapped around a perimeter of the handle 16 with little to no movement of the user's hand relative to the handle 16. Gripping can be further distinguished into various types of user contact 14 based on the number of the user's hands gripping the handle 16 (i.e. one or two), the number of fingers from each of the user's hands gripping the handle 16 (i.e. one to five); the amount of pressure exerted by the user's hand on the handle (e.g. low pressure grip vs. a high pressure grip), the length of time the user's hand(s) are engaged in gripping the handle 16 (e.g. a quick grip vs. a prolonged grip); movement, with respect to the hand, of one or more fingers that are not being not used for gripping; other factors; or combinations thereof.

As used herein, "sliding" includes a user's hand moving relative to a surface of the handle 16 while contacting the handle 16. Sliding can be further distinguished into various types of user contact 14 based on the number of the user's hands sliding along a surface of the handle 16 (i.e. one or two), the part of the user's hand sliding against the surface of the handle 16 (e.g. the palm of the hand and/or the fingers of the hand); the number of fingers from each of the user's hands sliding along the surface of the handle 16 (i.e. one to five); the amount of pressure exerted by the user's hand on the handle 16 (e.g. a low pressure slide vs. a high pressure slide), the length of time or distance the user's hand is contacting the handle 16 during the slide (e.g. a quick slide vs. a prolonged slide as to length of time, or a short slide vs. a long slide as to distance); the direction of the slide relative to the surface of the handle 16, relative to a component of the vehicle 2, or relative to the surrounding environment of the vehicle 2; other factors; or combinations thereof.

Touching the handle 16 without gripping or sliding can include, but is not limited to, pressing, tapping, hitting, or combinations thereof. Touching can be further distinguished into various types of user contact 14 based on the number of the user's hands touching the handle 16 (i.e. one or two), the part of the user's hand touching the handle 16 (e.g. the palm of the hand and/or the fingers of the hand); the number of fingers from each of the user's hands touching the handle 16 (i.e. one to five); the amount of pressure exerted by the user's hand on the handle (e.g. a low pressure touch vs. a high pressure touch), the length of time the user's hand is touching the handle 16 (e.g. a quick touch vs. a prolonged touch); other factors; or combinations thereof.

As will be appreciated, different types of user contact 14 with the handle 16 respectively produce different forces on the handle 16. These different forces on the handle 16 can in turn respectively produce different types of alterations to the vibrations 12 produced by the vehicle 2. For example, the user contact 14 can produce different types of alterations by suppressing, augmenting, or otherwise altering the vibrations 12 by an amount or degree that is a function of the type of user contact 14 made with the handle 16. The different types of alterations to the vibrations 12, which are a result of the different types of user contact 14 with the handle 16, can be detected by the sensor 8 and can thus be associated with a specific vehicle component 6 and/or with a specific predetermined function 18.

The alterations can include a change to one or more of amplitude or frequency of the vibrations 12, and can include a time component for such change, such as a long or a short change to the amplitude or frequency. The alterations can include a series of alterations to the vibrations 12, such as a series of changes to the amplitude or frequency of the vibrations 12. In a non-limiting example, where a first type and a second type of user contact 14 can be performed sequentially without a predetermined amount of time, thus producing a sequence of first alterations and second alterations to the vibrations 12. Because the sequence of first and second alterations occur within a predetermined amount of time, or because the first and second alterations occur in a particular order or are of a particular type, the first and second alterations can be grouped together by the controller 10 to be used to cause the vehicle component 6 to perform a specific predetermined function(s) 18 that is associated with the sequence of the first and second alterations; rather than the first and second alterations being considered to be independent from each other and used to cause the vehicle component 6 to perform separate predetermined functions 18 that are individually associated with the first and second alterations respectively. In one non-limiting embodiment, a series of alterations produces a first predetermined function to be performed, followed by a second predetermined function to be performed that is dependent on the first predetermined function to be performed first.

The predetermined function 18 performed by the vehicle component 6 is not particularly limited, and can include a function that may be typically performed by the vehicle component 6, not as a result of alterations to the vibrations, but as a result of conventional control of the vehicle component 6, or a function that is specifically reserved to being performed only as a result of alterations to the vibrations and not available as a result of conventional control of the vehicle component 6.

The predetermined function 18 can include for example notifying an emergency service provider of an emergency relating to the vehicle 2; displaying information on the display screen 28 or GUI; manipulating information displayed on the display screen 28 or GUI (e.g. rotating or scrolling through displayed information, causing a cursor to move over displayed information; changing displayed information, or changing a format of the display); selecting an application or function that is displayed on the display screen 28 or GUI and that is to be performed by a vehicle computer system or by another vehicle component 6 or causing such application or function to initiate; simply enabling the vehicle component 6 to be controlled e.g. through the user directly controlling the vehicle component 6 such as by directly touching the GUI or by using an input device 38 to manipulate the information displayed on the display screen 28 or to control another vehicle component 6; disabling the vehicle component 6 from being controlled by the user or otherwise; other functions; and combinations thereof. The predetermined function 18 may be a function performed by only one vehicle component 6, or by more than one vehicle component 6, such as the first vehicle component $6_A$, the second vehicle component $6_B$, and so on up to the $N^{th}$ vehicle component $6_N$.

As depicted in FIG. 3, the predetermined function 18 for the first vehicle component $6_A$ can include a first predetermined function (indicated "PF-A1") $18_{A1}$, a second predetermine function (indicated "PF-A2") $18_{A2}$, and so on up to an $N^{th}$ predetermined function (indicated "PF-AN") $18_{AN}$. The predetermined function 18 for the second vehicle component $6_B$, a first predetermined function (indicated "PF-B1") $18_{B1}$, a second predetermine function (indicated "PF-B2") $18_{B2}$, and so on up to an $N^{th}$ predetermined function (indicated "PF-BN") $18_{BN}$. The predetermined function 18 for the $N^{th}$ vehicle component $6_N$ can include a first predetermined function (indicated "PF-N1") $18_{N1}$, a second predetermine function (indicated "PF-N2") $18_{N2}$, and so on up to an $N^{th}$ predetermined function (indicated "PF-NN") $18_{NN}$.

Figure 4:
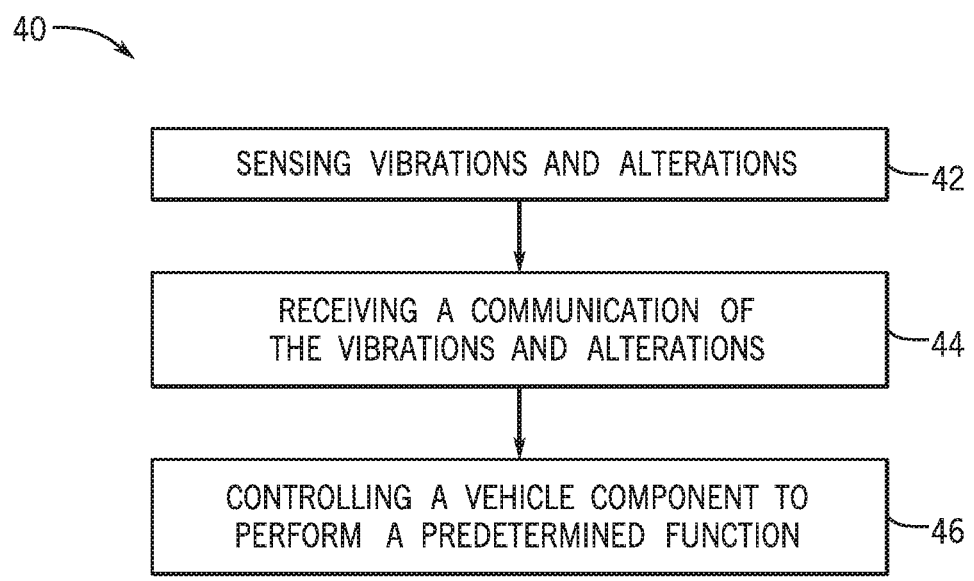
FIG. 4 is a schematic diagram of a method of controlling a vehicle component according to an exemplary embodiment.

A method 40 of controlling a vehicle component is depicted in FIG. 4, and at 42 includes sensing vibrations 12 and alterations to the vibrations 12. The vibrations 12 of the vehicle 2 and alterations to the vibrations 12 are sensed by the sensor 8 as described herein. The alterations are a result of user contact 14 with the handle 16, e.g. a handle 16 used for steering the vehicle 2.

At 44 the method 40 includes receiving a communication 26 of the vibrations 12 and alterations. The communication 26 is sent by the sensor 8 and received at the controller 10, and provides an indication of the vibrations 12 and alterations thereto.

At 46 the method 40 includes controlling the vehicle component 6 to perform the predetermined function 18. The vehicle component 6 is controlled by the controller 10, by way of the communication 36 that is sent from the controller 10 and received by the vehicle component 6. The communication 36 causes the vehicle component 6 to perform the predetermined function 18. The controller 10 may control only one (or some) vehicle component(s) 6 from among a plurality of vehicle components as a function of the one vehicle component 6 being associated with the alterations. In other words, the alterations may be associated with the one vehicle component 6 among the plurality of vehicle components that are in communication with the controller 10. The controller 10 may identify the one vehicle component 6 for controlling from among the plurality of vehicle components as a function of the association between the one vehicle component 6 and the alterations. Alternatively or in addition thereto, the controller 10 may control the vehicle component 6 to perform only one (or some) predetermined function(s) 18 from among a plurality of predetermined functions that the vehicle component 6 is capable of performing. This selection of the one predetermined function 18 may be made as a function of the one predetermined function 18 being associated with the alterations. In other words, the alterations may be associated with only the one predetermined function 18 among the plurality of predetermined functions that can be performed by the vehicle component 6. The controller 10 may identify the one predetermined function 18 for performing from among the plurality predetermined functions as a function of the association between the one predetermined function 18 and the alterations.

In one non-limiting embodiment, a user may be gripping the handle 16 while steering the vehicle 2 and while the vehicle is in motion. This may cause first alterations to the vibrations 12. These first alterations however may not be associated to a vehicle component 6 or to a predetermined function 18, and therefore may not indicate the user's intentions to control a vehicle component 6. However, the user may then lift one or more fingers off of the handle 16, which may cause second alterations to the vibrations 12 that are different from the first alterations. These second alterations may be associated with a first predetermined function. The controller determines that such an association exists, and thus causes the first predetermined function to be performed. The first predetermined function may include for example, causing information on the display screen 28 to move (e.g. scroll or rotate information) in a particular direction (e.g. in the direction that the user's fingers are moving when lifted off of the handle 16). The user may then squeeze the handle 16 with increased force than when previously gripping the handle 16 to produce third alterations to the vibrations 12. These third alterations may be associated with a second predetermined function. The controller determines that such an association exists, and thus causes the second predetermined function to be performed. The second predetermined function may include for example, a selection to be made of a particular portion of the information that is displayed on the display screen 28. This selection made on the display screen 28 may include launching or executing a computer application on a vehicle computing system or may include another vehicle component performing a predetermined function 18.

In another non-limiting embodiment, a user may take both hands off of the handle(s) 16. This may occur while the vehicle 2 is not moving but while the power source 20 is operating. The sensor 8 may then sense that there are no alterations to the vibrations 12 as a result of user contact 14 with the handle 16. No alterations to the vibrations 12 may be associated with a predetermined function 18. The controller 10 may then cause a vehicle component 6 to perform a predetermined function 18. This may include enabling a vehicle component 6 to be directly controlled by the user. For example, a user may directly interact with the GUI or the input device 38, which otherwise during movement of the vehicle 2 would not be enabled for control by the user. Such interaction with the GUI or the input device 38 may include manipulating information displayed on the display screen 28 to control another vehicle component 6, such as a stereo system or navigation program for example. A user may also have both hands off of the handle(s) 16 when the vehicle 2 is not moving and while the power source 20 is not operating. The vehicle 2 may therefore not produce vibrations 12 and the sensor 8 may then detect no vibrations 12 and thus no alterations to the vibrations. The controller 10, based on the lack of vibrations and lack of alterations, may disable the power source 20, such that the power source 20 cannot be started without the user placing both hands on the handle(s) 16. A user may also have both hands off of the handle(s) 16 when the vehicle 2 is moving and while the power source 20 is operating. The sensor 8 may then detect the vibrations 12 but no alterations due to the lack of user contact 14 with the handle 16. This situation may indicate a dangerous situation, such as an impending accident. It will be understood that vibrations 12 produced by a moving vehicle 2 with the power source 20 operating, may be different than vibrations 12 produced by a stationary vehicle with the power source 20 operating. Such differences in vibration may allow the controller 10 to distinguish between a moving vehicle and a non-moving vehicle, even though both vehicles have an operating power source 20. The controller 10 may then cause a vehicle component to perform the predetermined function 18 that is associated with no alterations to the vibrations. Such predetermined function 18 may include sending a communication to an emergency response system, and/or may include the display generating a warning to the user to place both hands back on the handle(s) 16.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A control system of a vehicle comprising:
a sensor detecting vibrations of the vehicle;
a controller in communication with the sensor and in communication with a vehicle component of the vehicle, wherein contact by a user with a steering handle of the vehicle produces alterations to the vibrations that are detected by the sensor and wherein the controller controls the vehicle component to perform a predetermined function associated with the alterations.

2. The control system according to claim 1, wherein:
the vehicle component is one of a plurality of vehicle components that are in communication with the controller and the controller controls the vehicle component from among the plurality of vehicle components as a function of the vehicle component being associated with the alterations.

3. The control system according to claim 2, wherein:
the predetermined function is a first predetermined function;
the vehicle component is a first vehicle component; and
if no alterations are detected by the sensor, the controller enables a second vehicle component of the plurality of vehicle components to be directly controlled by a user, or the controller controls the second vehicle component to perform a second predetermined function.

4. The control system according to claim 2, wherein:
association between the vehicle component and the alterations can be established by a user of the vehicle; and
association between the predetermined function and the alterations can be established by the user of the vehicle.

5. The control system according to claim 2, wherein:
the alterations includes a sequence of a first alteration to the vibrations and a second alteration to the vibrations;
the controller controls the vehicle component from among the plurality of vehicle components as a function of the vehicle component being associated with the first alteration; and
the controller controls the vehicle component to perform the predetermined function from among a plurality of predetermined functions, as a function of the predetermined function being associated with the second alteration.

6. The control system according to claim 5, wherein association between the vehicle component and the first alteration can be established by a user of the vehicle.

7. The control system according to claim 5, wherein association between the predetermined function and the second alteration can be established by a user of the vehicle.

8. The control system according to claim 5, wherein the first alteration is produced by a first type of the user contact, and the second alteration is produced by a second type of the user contact.

9. The control system according to claim 1, wherein the sensor comprises an accelerometer.

10. The control system according to claim 9, wherein the sensor is arranged on the handle or on a center console of the vehicle.

11. A method of controlling a vehicle component, comprising:
   sensing with a sensor, vibrations of a vehicle, and alterations to the vibrations resulting from user contact with a steering handle of the vehicle;
   receiving at a controller and from the sensor, a communication of the vibrations and the alterations sensed by the sensor;
   controlling with the controller, the vehicle component to perform a predetermined function associated with the alterations.

12. The method according to claim 11 wherein the controller controls the vehicle component from among a plurality of vehicle components as a function of the vehicle component being associated with the alterations.

13. The method according to claim 12, wherein:
   the predetermined function is a first predetermined function;
   the vehicle component is a first vehicle component; and
   if no alterations are detected by the sensor, the method further comprises:
     enabling a second vehicle component of the plurality of vehicle components to be directly controlled by a user; or
     controlling, with the controller, the second vehicle component to perform a second predetermined function.

14. The method according to claim 12, wherein:
   association between the predetermined function and the alterations is established by a user of the vehicle; and
   association between the vehicle component and the alterations is established by the user of the vehicle.

15. The method according to claim 12, wherein:
   the alterations includes a sequence of a first alteration to the vibrations and a second alteration to the vibrations;
   the controller controls the vehicle component from among the plurality of vehicle components because the vehicle component is associated with the first alteration; and
   the controller controls the vehicle component to perform the predetermined function from among a plurality of predetermined functions as a function of the predetermined function being associated with the second alteration.

16. The method according to claim 15, wherein association between the vehicle component and the first alteration is established by a user of the vehicle.

17. The method according to claim 15, wherein association between the predetermined function and the second alteration is established by a user of the vehicle.

18. The method according to claim 15, wherein the first alteration is produced by a first type of the user contact, and the second alteration is produced by a second type of the user contact.

19. The method according to claim 11, wherein the sensor comprises an accelerometer.

20. A vehicle including:
   a steering handle;
   a vehicle component;
   a sensor detecting vibrations off the vehicle; and
   a controller in communication with the sensor and in communication with the vehicle component;
   wherein user contact with the steering handle produces alterations to the vibrations, and
   wherein the controller controls the vehicle component to perform a predetermined function associated with the alterations.

* * * * *